(No Model.) 2 Sheets—Sheet 1.
A. MASON.
APPARATUS FOR DISTILLING OIL.

No. 444,203. Patented Jan. 6, 1891.

WITNESSES:

INVENTOR
Allan Mason.
BY A. P. Thayer,
ATTORNEY (No Model.) 2 Sheets—Sheet 2.

A. MASON.
APPARATUS FOR DISTILLING OIL.

No. 444,203. Patented Jan. 6, 1891.

WITNESSES:

INVENTOR
Allan Mason
BY A. P. Thayer.
ATTORNEY

UNITED STATES PATENT OFFICE.

ALLAN MASON, OF BROOKLYN, NEW YORK.

APPARATUS FOR DISTILLING OIL.

SPECIFICATION forming part of Letters Patent No. 444,203, dated January 6, 1891.

Application filed March 8, 1888. Serial No. 266,558. (No model.)

*To all whom it may concern:*

Be it known that I, ALLAN MASON, a citizen of the United States, residing at Brooklyn, in the county of Kings and State of New York, have invented certain new and useful Improvements in Apparatus for Distilling Oil; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

The object of my invention is to provide improved apparatus for continuous fractional distillation, by which the operation may proceed in a continuous, uniform, and contemporaneous development of the fractional parts and separate collection of the same without residue in the retort or still, by which more regular and uniform treatment of the crude oils is secured, better and more uniform products are obtained, and much of the present waste of heat, time, and material is avoided, and by which any one desired product may be obtained—that is to say, the grades of separation are controllable at the will of the operator, all as hereinafter fully described, reference being made to the accompanying drawings, in which—

Figure 1:
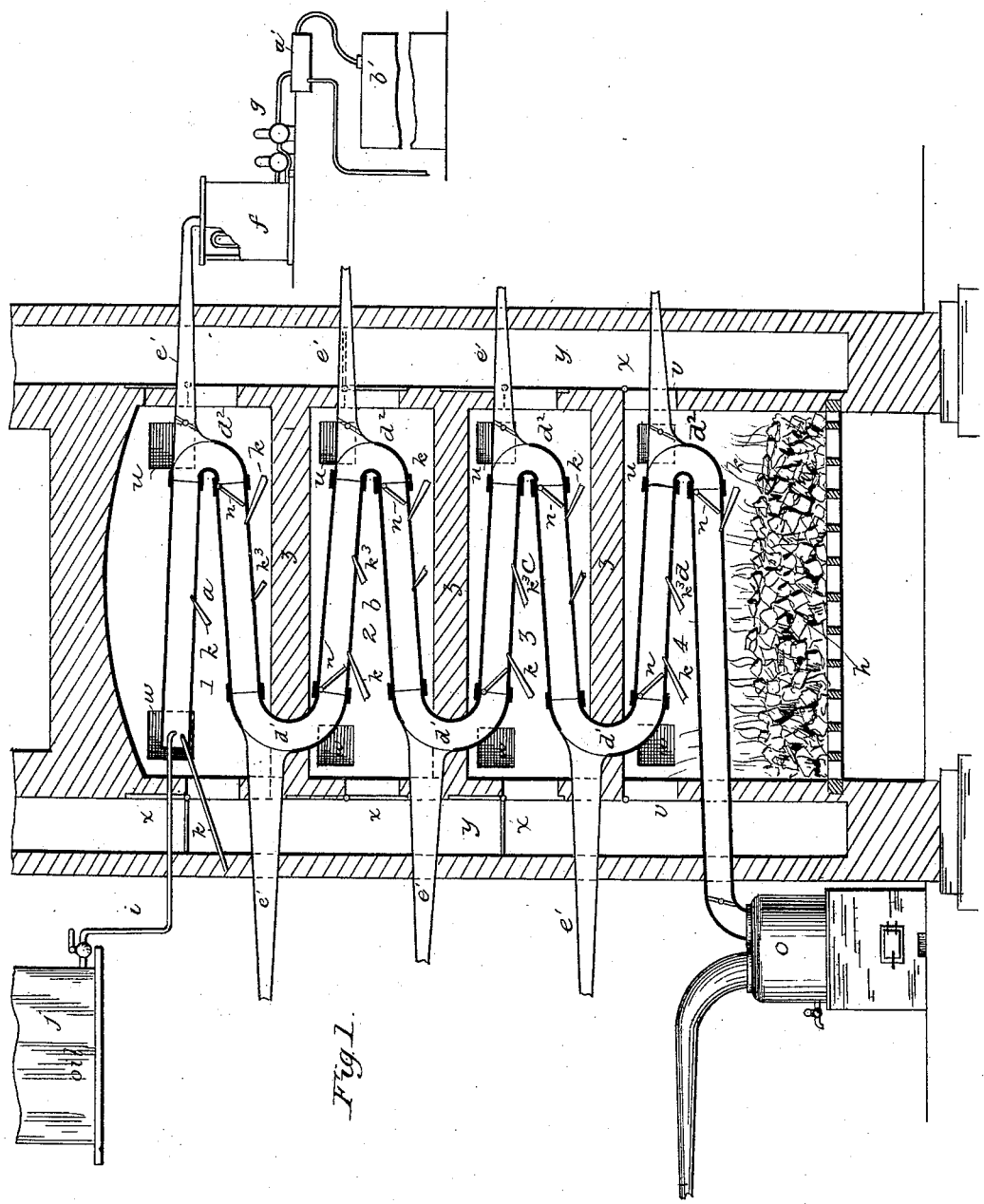
Figure 2:
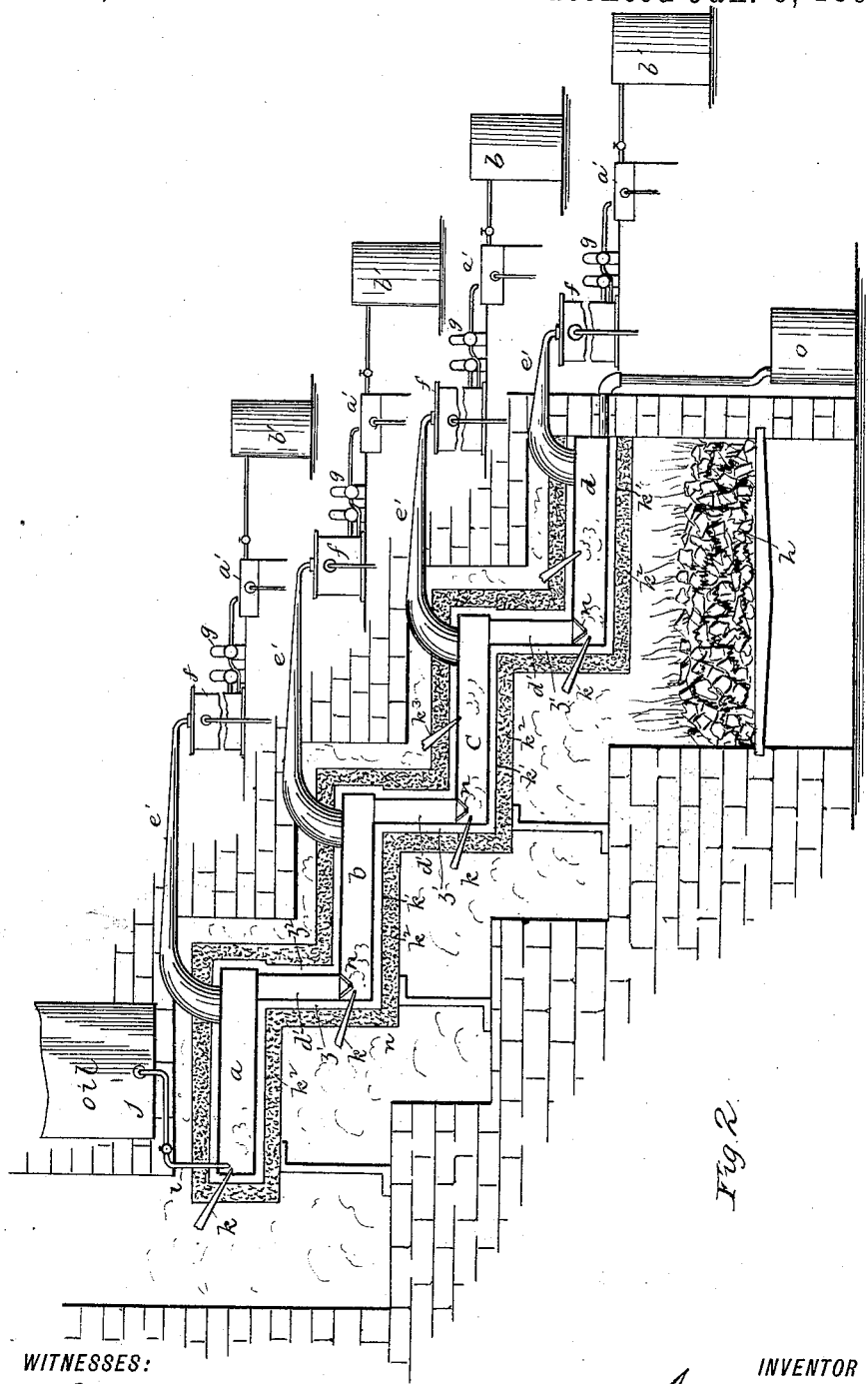

Figure 1 represents my improved apparatus partly in side elevation and partly in sectional elevation. Fig. 2 is a similar view of the same in a modified arrangement.

I provide the continuous and preferably vertical coiled (as in Fig. 1) pipe-retort made in as many different successive sections or chambers $a\ b\ c\ d$ as the number of fractional products I wish to make; but it may be a direct course, as in Fig. 2, each successive section being arranged a little lower than the one preceding, and in a separate chamber or space 1 2 3 4, &c., of the furnace divided by partitions Z or by contracted flues Z', through which the sections are connected by descending bends or pipe portions $d'$ and having a goose-neck $e'$ branching off from each section at or about where the turn into $d'$ begins; also, another goose-neck from the other bend $d^2$ when the retort-sections comprise two lengths of coil in each furnace-chamber, as I propose to make them, said goose-necks each connecting with a separate condenser $f$, which discharges into a settling-trough $a'$ through a pump $g$, if desired, for drawing on the vapor and maintaining a vacuum in the condenser. From the settling-trough the products may be run off into any approved receptacle $b'$.

With each section of the retort provision is made for suitably heating the same by fire heat produced in the furnace $h$ below, or it may be a separate fire in each compartment, or by steam heat in a surrounding jacket $k'$, or both, as preferred, and with an inclosing sand jacket $k^2$, as in Fig. 2, if desired to regulate the heat; but I prefer to utilize the heat from furnace $h$, with chimneys $y$ and dampers $x$, contrived to admit the heat to or exclude it from the respective chambers, and with air-passages and valves $w$ to grade the heat of the successive sections as much higher than that of the preceding sections and to regulate the same, as is requisite for the different grades of products desired. The successive sections may be longer, according as the heavier products require longer time of exposure to heat; but the same result may be obtained with sections of uniform length by correspondingly greater intensity of heat.

The heat may enter either chimney $y$ through a passage $v$, the other being closed by its damper $x$, and be turned from the chimney into the next chamber above, and therefrom through the chimney at the other side into the next chamber, and so on in regular succession; or it may be shut off at any time from any one chamber when the chamber may happen to be too highly heated and conducted past into the next chamber, and if it is desired to cool down any chamber quickly air-passages $w$ may be opened to allow air to enter and draw through into one or the other of the chimneys for that purpose, and when it may be desired to produce different temperatures in some of the different sections than may be had by the passage of the heat through them in regular order—as, for instance, to check it in the first and third without change in the second and fourth—the arrangement of flues and dampers is such that the heat may be shut off from the third and first chamber, while continuing its course through the fourth and second sections. Into the upper or front end of the first section $a$ of the retort thus contrived I cause the oil to flow in a continuous and regulated stream through a suitable feed-pipe $i$, from the storage reservoir or tank $j$, which stream is received on an impinging jet of steam, which I use for its beneficial effects in facilitating the atomizing of the oil by direct impingement of the steam-jet on the oil as it enters the retort in the first instance, and also as it enters the different sections of the retort for aiding separation by mechanical action of the impact of the solid jet of steam on the stream of oil. The oil thus instantaneously atomized on entering the retort-section is by the atomizing jets projected along the hot interior of the retort toward the fall $d'$, the temperature of which is graduated to the requisite power for vaporizing the lighter grade of product required, and the remaining oil falls down into the next section through connections $d'$, while the vaporized portion subject to the vacuum in the condenser or condensers passes over into it or them, according as the section is connected with one or more condensers. The oil falling into the next section passes through a funnel or gate $n$, which is a kind of trap to prevent the flow of vapor from one section to another of the retort, and is again distilled with greater heat, suited to develop the next grade of product, and so on to the last section, which discharges any heavy oil, tar, or other residue that may remain unvaporized into any suitable receptacle $o$, or it may be a tar-still while yet in a fluid state, so that, instead of carbonization of the lower portions of the oil on the bottom of the still and causing operations to be suspended from time to time for removing the tar cake or other resulting product, my still is self-cleaning and operative indefinitely. It is also continuously and contemporaneously operative in each section. There are no stages of periodical cessation as in the old process, nor variations in the qualities of the different grades, such as result in the old process during the changes of temperature in the progress of the different stages of cooking.

The several sections of the retort will preferably have slight descending inclinations suitable for causing the oil to flow, as desired, when the dry process above described is used; but I will also, when desired, use steam for utilizing its beneficial effects in facilitating the evaporation of the oil by direct impingement of the steam on the oil as it enters the different sections of the retort for aiding separation by mechanical action of impact in the first instance, and as a vehicle, so to speak, whereby the atoms of steam becoming loaded or charged with the particles of oil carry them by diffusion of the steam to all parts of the space in the retort, and thus distribute the oil in the heat, so that instantaneous vaporization and the desired attenuation of the vapor ensue, and with much lower heat than when the vapor is evaporated from bulk. In this arrangement it is not so important to have the sections inclined, and they may be level or nearly so.

This invention is substantially the application in fractional distillation of the process employed for producing one oil by James B. Grant and myself, and described in the patent granted to us April 6, 1886, No. 339,545. In that process we have demonstrated that with suitable heat applied to the retort, and with steam from 212° to 300° Fahrenheit intimately mingled by the forcible conjunction of streams or jets of steam and oil, and by a vacuum-condenser to rapidly and continuously conduct the oil through the retort to prevent accumulation in bulk, and to effect the instantaneous exposure to heat by expansion of the oil through the medium of the steam, the entire substance of the oil may be vaporized at once and be recovered as one oil of superior quality and high fire test, the impurities being distilled out and taken up by a peculiar affinity of the water for them and certain undesirable portions and separating with the water by gravitation. In this case I have contrived to separate said process into several progressive steps, according to the number of grades into which I wish to effect separation, and produce one grade by each step, converting, as before, all the oil without residue in the retort, but in fractional products instead of one product, and to this end I provide a steam-injector $k$ with each section of the retort and in such relation to the inflowing oil that the steam-jet impinges on the oil and facilitates its evaporation and the attenuation of the vapor, as above described; but in this case I gage the quantity and force of the jets, also the heat of the jets and of the retorts, to effect the partial separations, as desired, in each section, instead of the entire evaporation at once.

By the mechanical effect of the steam and also by the divisional devices of the retort I am able to make separations largely independent of the grades of separation due to different temperatures of heat alone. For instance, I can take off a first grade of, say, one hundred and ten degrees fire test and all the rest in a second grade, or in as many more as I wish, continuing the process destructively, or I can grade the products same as usual by the old processes. In the first section the injector is arranged in suitable proximity to the mouth of the feed-pipe to impinge the steam on the oil, and in the others the injectors are similarly arranged relatively to the issue from the traps $n$, as shown, for the same purpose.

If greater mechanical action than one jet will effect may be required in those advanced sections of the retort where the heat is greater and the oil more dense, I will arrange one or more steam-nozzles $k^3$ therein for the purpose besides nozzles $k$.

By the term "continuously-flowing stream" I do not mean to limit myself to the strict construction thereof, for I consider that a regular intermittent feed will in some cases and with some grades of oil be desirable. For example, it will be more feasible to feed a viscous oil by intermittent measures of a large volume than by a small continuous stream, and in such case, and probably others too, it may be desirable to have like intermittent progress of the oil along the retort, all of which I include in my continuous process.

I am aware of the patent to Vander Weyde, No. 53,062, in which there is a system of flues so contrived that if dampers were employed the heat could be turned off from one or more of the sections of the still, beginning with the upper end of the series; but this is not what is accomplished by my system of flues and dampers, mine being contrived to cut out or regulate the heat in any one or more of the sections without interruption or change in the rest, either above or below.

The process is claimed in a pending application filed January 30, 1888, Serial No. 262,475.

What I claim, and desire to secure by Letters Patent, is—

1. The combination, in a still for continuous fractional distillation, of the continuous pipe-retort, comprising a series of successive chambers, each having the oil-inlet and a steam-injector at the receiving end impinging the steam jet directly on the entering stream of oil, so as to instantly atomize it in one body and project the same along the chamber to the opposite end, and each section having a vapor-exit and an oil-exit thereat, through which the vapor and oil respectively escape, the one to the condenser and the other to the next section of the retort, the arrangement being such that all of both the vapor and the unvaporized oil have like exposure as to heat and time in the respective sections of the retort, substantially as described.

2. The combination, in a still for continuous fractional distillation, of the continuous pipe-retort, comprising a series of successive chambers, each having the oil-inlet and a steam-injector at the receiving end impinging the steam jet directly on the entering stream of oil, so as to instantly atomize it in one body and project the same along the chamber to the opposite end, and each section having a vapor-exit and an oil-exit thereat, through which the vapor and oil respectively escape, the one to the condenser and the other to the next section of the retort, the arrangement being such that all of both of the vapor and the unvaporized oil have like exposure as to heat and time in the respective sections of the retort, the furnace underneath said pipe-retort made in separate sections, each containing a section of the retort, the flues at the opposite extremities of the chambers and the passages and dampers causing the regular or irregular traverse of the heat products through the successive sections of the furnace, substantially as described.

In testimony whereof I affix my signature in presence of two witnesses.

ALLAN MASON.

Witnesses:
W. J. MORGAN,
A. P. THEYER.